United States Patent
Martin-Laval et al.

(10) Patent No.: US 9,739,435 B2
(45) Date of Patent: Aug. 22, 2017

(54) DEVICE FOR POSITIONING A MEMBER FOR TRANSMITTING SOLAR ENERGY RELATIVE TO AN OPTICAL CONCENTRATOR

(71) Applicant: ECHY, Champs sur Marne (FR)

(72) Inventors: Quentin Martin-Laval, Paris (FR); Paul Fourment, Paris (FR)

(73) Assignee: ECHY, Champs sur Marne (FR)

(*) Notice: Subject to any disclaimer, the term of this patent is extended or adjusted under 35 U.S.C. 154(b) by 0 days.

(21) Appl. No.: 14/655,484

(22) PCT Filed: Dec. 24, 2013

(86) PCT No.: PCT/FR2013/053261
§ 371 (c)(1),
(2) Date: Jun. 25, 2015

(87) PCT Pub. No.: WO2014/102505
PCT Pub. Date: Jul. 3, 2014

(65) Prior Publication Data
US 2015/0354770 A1     Dec. 10, 2015

(30) Foreign Application Priority Data
Dec. 26, 2012   (FR) .................... 12 62770

(51) Int. Cl.
*G02B 7/02*     (2006.01)
*F21S 11/00*    (2006.01)
(Continued)

(52) U.S. Cl.
CPC ............ *F21S 11/002* (2013.01); *F21V 19/00* (2013.01); *G02B 19/0042* (2013.01); *Y10T 29/49828* (2015.01)

(58) Field of Classification Search
CPC ......... Y02E 10/52; Y02E 10/47; Y02E 10/50; Y02E 10/42; Y02E 10/43; Y02E 10/45;
(Continued)

(56) References Cited

U.S. PATENT DOCUMENTS 3,295,913 A    1/1967  Walther
4,126,379 A   11/1978  Wu
(Continued)

FOREIGN PATENT DOCUMENTS

| CA | 2 253 024 A1 | 4/2000 |
| EP | 2 325 548 A2 | 5/2011 |
| KR | 20090031223 A | 3/2009 |

OTHER PUBLICATIONS

International Search Report dated May 22, 2014 from corresponding International Application No. PCT/FR2013/053261; 6 pgs.

*Primary Examiner* — Alicia M Harrington
(74) *Attorney, Agent, or Firm* — Maier & Maier, PLLC

(57) ABSTRACT

A device for positioning the intake of a member, for transmitting solar energy relative to a convergent optical concentrator, including a mounting provided with at least one reserve suitable for receiving and supporting the optical concentrator in a predetermined direction and allowing light to pass through said mounting, a receiver suitable for receiving and supporting the intake of the transmitting member, and at least one spacer element in order to keep said receiver spaced apart from the mounting in a stationary position relative to said reserve, said stationary position being defined in accordance with the features of the transmitting member and optical concentrator.

9 Claims, 3 Drawing Sheets

(51) Int. Cl.
G02B 19/00 (2006.01)
F21V 19/00 (2006.01)

(58) Field of Classification Search
CPC ............ H01L 31/0543; H01L 31/054; H01L 25/0753; H01L 31/02021; H01L 31/022425; H01L 31/0504; H01L 33/54; H01L 33/58; F24J 2/067; F24J 2/085; F24J 2/46; F24J 2/5241; F24J 2/05; F24J 2/06; F24J 2002/4656; F24J 2/00; F24J 2/0488; F24J 2/08; F24J 2/5201; F24J 2/5232; G02B 19/0028; G02B 6/0006; G02B 19/0042; F21S 11/002; F21V 19/00; Y10T 29/49828
USPC ........................................................ 359/811
See application file for complete search history.

(56) References Cited

U.S. PATENT DOCUMENTS

| | | | | |
|---|---|---|---|---|
| 4,515,151 A | * | 5/1985 | Slemmons | ............... F24J 2/204 126/569 |
| 2002/0179138 A1 | * | 12/2002 | Lawheed | ................. F24J 2/085 136/246 |
| 2009/0314333 A1 | * | 12/2009 | Shepard | .................. G02B 6/04 136/248 |
| 2011/0067687 A1 | | 3/2011 | Raymond et al. | |
| 2012/0243836 A1 | | 9/2012 | Kim | |

* cited by examiner

DEVICE FOR POSITIONING A MEMBER FOR TRANSMITTING SOLAR ENERGY RELATIVE TO AN OPTICAL CONCENTRATOR

FIELD

The present invention relates to the field of the transportation and distribution of solar energy, in the form for example of light, from a collection zone to dark rooms devoid of conventional openings or in addition thereto, the collection and transportation being respectively carried out by means of an optical concentrator and a transmitting member wherein one of the ends is situated facing said optical concentrator and conventionally comprising a bundle of at least one optical fibre. The present invention relates more particularly to a device for positioning said transmitting member in relation to said optical concentrator, and also the method for manufacturing said positioning device.

BACKGROUND

Light sources suitable for illuminating the interior of a building are usually divided between artificial lighting (e.g. electric bulb) and openings communicating directly with the outside.

However, the increase in the cost of energy and environmental constraints render the use of electricity increasingly unsuitable for illuminating the different rooms of a building. Yet the use of artificial lighting is necessary in many rooms where it is impossible to make openings communicating directly with the outside, i.e. particularly the case of rooms situated directly inside a building or in the basement.

Solar energy thus offers the most economical source of lighting available. However, even in rooms provided with windows, said windows are not always sufficient to provide sufficient lighting. This is particularly the case in classrooms where artificial lights are constantly switched on as the exterior light arrives laterally and not uniformly.

In order to address these different problems, technical solutions have been developed in order to convey exterior light in all rooms with the comfort of artificial lighting (direction and constant power).

Of all these technologies, light wells are the most widely used. A light well usually comprises a collection zone, a transmission zone and a diffusion zone.

The collection zone is advantageously positioned on the roof of the building. In simple systems, it may adopt the form of a roof window or a dome. In more complex systems, it may also consist of optical concentrators suitable for collecting and concentrating solar radiation and comprising for example a set of mirrors and/or lenses.

The light collected is consequently concentrated at the intake of light transmitting members, these members being suitable for transmitting light to the diffusion zone with minimum loss while retaining the specificity of natural light.

One of the drawbacks of light wells is that the efficiency thereof may drop significantly due to poor positioning of the intake of the transmitting members in relation to the optical concentrator. Indeed, if the light collected is not correctly concentrated at the intake of light transmitting members, it is obvious that loss will inevitably occur in terms of the light transmitted.

SUMMARY

The aim of the present invention is thus that of remedying the drawbacks mentioned above and proposing a simple and reliable device for positioning the intake of a transmitting member relative to the associated optical concentrator. Said device is suitable for ensuring a stable position at a specific point of the intake of said transmitting member relative to the features of the associated optical concentrator.

According to the invention, a device is proposed for positioning the intake of a member for transmitting solar energy relative to a convergent optical concentrator, characterised in that it comprises a mounting provided with at least one reserve suitable for receiving and holding the optical concentrator in a predetermined direction and allowing light to pass through said mounting, a receiver suitable for receiving and holding the intake of the transmitting member, and at least one spacer element in order to keep said receiver spaced apart from the mounting in a stationary position relative to said reserve, said stationary position being defined in accordance with the features of the transmitting members and optical concentrator.

The optical concentrator is advantageously a convergent lens comprising two frontal faces called the front dioptre and rear dioptre, and a peripheral face joining the two front and rear dioptres.

The mounting is preferably made of ultra-high-performance fibre concrete. To date, solar concentrators have been, for weight reasons, mostly made of metal, giving rise to fine and costly mechanical adjustments. The mechanical features of the fibre concrete make it possible to obtain an equivalent precision for a considerably lower price. The applicants demonstrated that this type of material is perfectly suitable for producing solar concentrators and that the density of the fibre concrete is not a drawback in this field.

Advantageously, the mounting is a plate comprising a front face, a rear face, and a perimetric face joining said front and rear faces.

The mounting preferably comprises fixing members arranged to enable the securing of the mounting on a structure. According to one advantageous embodiment, the reserve comprises an orifice passing through the mounting on either side and a first countersink formed on the front face of the mounting coaxially with said orifice, the respective transverse sections of the orifices and first countersink being homothetic to that of the peripheral face of the optical concentrator, and the dimensions of the transverse section of the orifice and the first countersink being respectively slightly less and greater than those of the transverse section of the peripheral face of the optical concentrator.

According to one advantageous embodiment, the reserve comprises a second countersink formed on the front face of the mounting coaxially with the first countersink.

The receiver is preferably a tubular member comprising female or male connectors suitable for engaging with male or female connectors arranged on the intake of the transmitting member.

Advantageously, each spacer is a rigid rod fixed at the ends thereof respectively to the rear face of the mounting and the receiver.

According to a further embodiment, said spacer is co-moulded with said mounting. According to one particularly preferred embodiment, said mounting and said spacer are made of ultra-high-performance fibre concrete.

According to a further embodiment, said spacer comprises a hollow truncated cone-shaped part. Preferably, said truncated cone-shaped part is open on the greater diameter thereof and comprises on the base having a lesser diameter thereof a reserve suitable for receiving said receiver. Particularly preferably, said truncated cone-shaped part comprises at the base having a greater diameter thereof an annular shoulder extending radially outwards from said truncated cone-shaped part.

The present invention also relates to a method for manufacturing the positioning device according to the invention, characterised in that it consists of the following steps:
- producing substantially horizontal formwork determining the front face and the perimetric face of the mounting of the positioning device;
- positioning, in said formwork, one (or more) cavity/cavities corresponding to the negative shape of the reserve(s);
- positioning at the centre of each cavity a substantially vertical laying member, said laying member being designed to position and hold the receiver in the final position thereof during the manufacture of the positioning device;
- fixing at least one spacer on the receiver;
- positioning a receiver on the associated laying member;
- casting ultra-high-performance fibre concrete material into the formwork between the cavity/cavities taking care to embed the free end of each spacer;
- removing the formwork from the positioning device in the upward direction.

Before the step for positioning the laying member, the manufacturing method preferably comprises a step for producing said laying member with an abutment, said abutment being arranged along the laying member and such that, when the receiver is bearing thereon, it is situated at the point of convergence of the beam of light rays from the optical concentrator.

The steps for producing the formwork and positioning the cavity/cavities are advantageously carried out simultaneously.

According to one preferred embodiment, the method according to the invention further comprises, before the casting step, a step for positioning at least one separating element connecting at least two laying members and preferentially all the laying members. According to one more preferred embodiment, said separating element is a plate intended to be placed perpendicularly in relation to said laying members. Said plate comprises bore holes suitable for receiving said separating elements. According to one particularly preferred embodiment, a plurality of separating elements are placed, parallel with each other on either side of said formwork.

According to a further embodiment, the method for manufacturing the positioning device according to the invention is characterised in that it consists of the following steps:
- producing substantially parallelepipedic formwork determining the front face and the perimetric face of the mounting of the positioning device;
- positioning, in said formwork, one (or more) cavity/cavities corresponding to the negative shape of the reserve(s), spacer and intake;
- casting ultra-high-performance fibre concrete material into the formwork between the cavity/cavities taking care to embed the cavity of the intake;
- removing the formwork from the positioning device in the upward direction.

According to one even more preferred embodiment, said formwork is a parallelepiped open on the top face thereof and the cavity/cavities form a cylinder comprising on the top face thereof a cavity corresponding to the negative shape of said intake.

According to a further embodiment, the method for manufacturing the positioning device according to the invention is characterised in that it consists of the following steps:
- producing substantially parallelepipedic formwork determining the front face, a side face, and the rear face of the mounting of the positioning device;
- positioning, in said formwork, one (or more) cavity/cavities corresponding to the negative shape of the reserve(s), spacer and intake;
- casting ultra-high-performance fibre concrete material into the formwork between the cavity/cavities;
- removing the formwork from the positioning device.

According to a further embodiment, the method for manufacturing the positioning device according to the invention is characterised in that it consists of the following steps:
- producing a mould forming a cavity having a T-shaped cross-section and a circular transverse section determining the front face, rear face and perimetric face of the mounting of the positioning device;
- casting ultra-high-performance fibre concrete material into said mould;
- positioning, in said mould, a countermould, corresponding to the negative shape of the reserve(s), spacer and intake;
- removing the formwork from the positioning device in the upward direction by removing the countermould, and then from said mould in the upward direction.

According to one even more preferred embodiment, said countermould forms a cylinder comprising on the bottom face thereof a cavity corresponding to the negative shape of said intake suitable for coming into contact with the bottom of said mould.

According to a further embodiment, the method for manufacturing the positioning device according to the invention is characterised in that it consists of the following steps:
- producing a mould forming a cavity, having a T-shaped cross-section and a circular transverse section, determining the front face, rear face and perimetric face of the mounting of the positioning device;
- positioning, in said mould, a countermould, corresponding to the negative shape of the reserve(s), spacer and intake;
- casting ultra-high-performance fibre concrete material into said mould;
- removing the formwork from the positioning device in the upward direction by removing the countermould, and then from said mould in the upward direction.

According to one even more preferred embodiment, said countermould forms a cylinder comprising on the bottom face thereof a cavity corresponding to the negative shape of said intake suitable for coming into contact with the bottom of said mould.

BRIEF DESCRIPTION OF THE FIGURES

Further advantages and features will emerge more clearly from the description hereinafter of an embodiment of a positioning device according to the invention with reference to the appended figures wherein.

DETAILED DESCRIPTION

Figure 1:
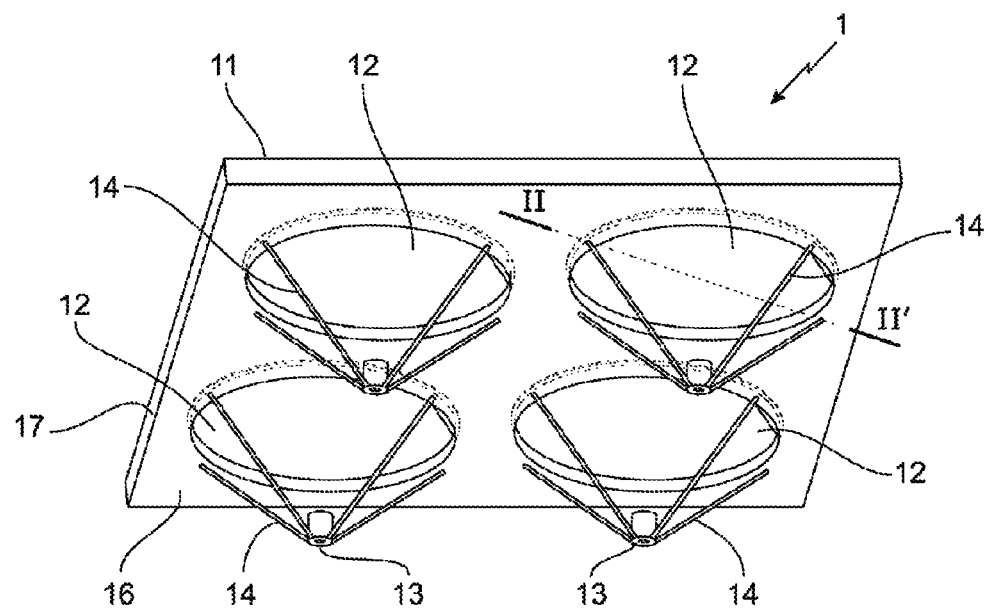
FIG. 1 is a perspective view of a positioning device according to the invention.
Figure 2:
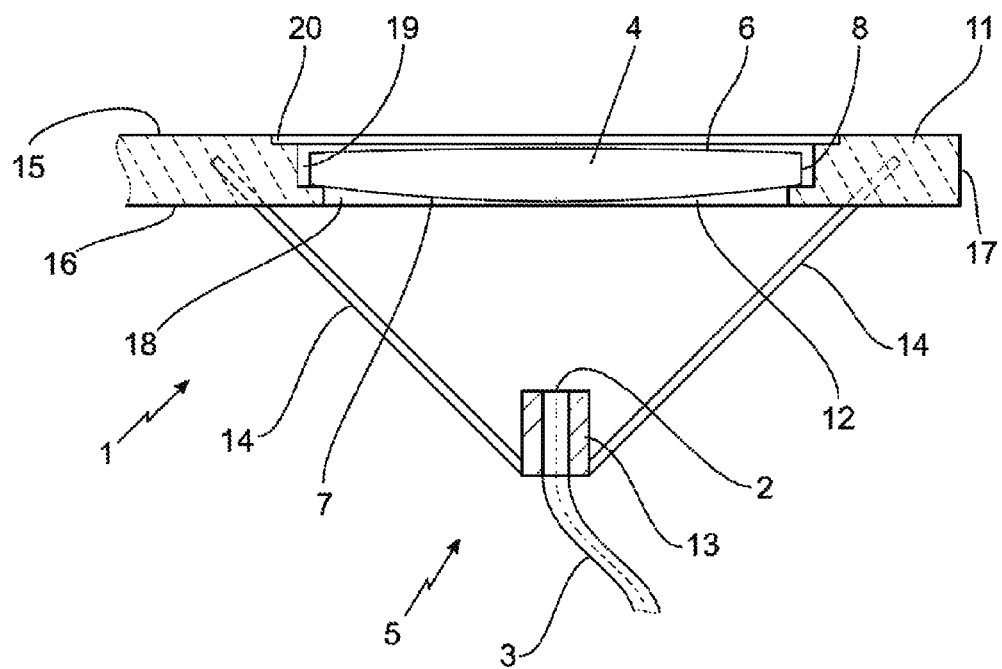
FIG. 2 is a vertical section of the positioning device along the axis II-II' in FIG. 1.

FIGS. 1 to 2 represent a positioning device 1 designed for positioning at a fixed point one 2 of the ends, hereinafter referred to as "intake", of a solar energy transmitting member 3 relative to an optical concentrator 4. Said transmitting member 3 is preferably part of a hybrid lighting system 5 reducing the electricity consumption of artificial lighting by importing natural light. Said intake 3 of the transmitting member 3 is arranged facing said optical concentrator 4.

Said hybrid lighting system 5 further comprises diffusion means (not shown in the figures) connected to the other end, hereinafter referred to as "output", of the transmitting member 3 and suitable for diffusing in a room the light collected outside by the optical concentrator 4 and transmitted by said transmitting member 3.

The transmitting member 3 is advantageously a bundle of at least one optical fibre not shown in the figures. Indeed, the flexibility of optical fibres enables the integration thereof in all types of buildings regardless of the internal layout thereof.

However, the transmitting member 3 may also be of any other type and, for example, be a transmission tube with highly reflective inner walls, without leaving the scope of the present invention. However, the rigidity of this type of transmission tubes is not suitable for adapting to all trajectories and all types of buildings.

In the present description, a transmitting member 3 belonging to a hybrid lighting system 5 is preferentially described. However, said transmitting member 3 may, without leaving the scope of the present invention, belong to any other system such as, for example, an electrical or thermal energy production system. In the latter case, the transmitting member 3 will be a concentrating photovoltaic cell or a thermal cell, respectively.

The optical concentrator 4 is advantageously a convergent lens, such as for example a Fresnel lens, converting a substantially parallel beam of natural light rays, similar to a plane wave, into a beam of light rays converging towards a point situated downstream from the lens, said point of convergence being the focal point of said lens.

The optical concentrator 4 then comprises two frontal faces converting the beam of natural light, referred to as the front dioptre 6 and rear dioptre 7, and a peripheral face 8 joining the two front 6 and rear 7 dioptres.

The terms front and rear are defined herein according to the direction of the natural light from the optical concentrator 4 to the transmitting member 3.

Conventionally, the transverse section of the peripheral face 8 is circular. However, said transverse section of the peripheral face 8 may also have any other shape and, for example, have a square polygonal or triangular shape, without leaving the scope of the present invention.

Similarly, a globally tubular peripheral face 8 is represented in the figures. However, for manufacturing and positioning reasons, said peripheral face 8 may also be of any other type and, for example, have a rim facilitating the fixing thereof on a mounting, without leaving the scope of the present invention.

To ensure optimal efficiency of the hybrid lighting system 5, the positioning device 1 makes it possible to position simply and durably, the intake 2 of the transmitting member 3 at a predetermined distance from the optical concentrator 4, corresponding substantially in the case of the hybrid lighting 5 to the focal point of said optical concentrator 4.

However, when the transmitting member 3 is part of an electrical or thermal energy production system, the intake of said transmitting member 3 will not necessarily be positioned at the focal point of the optical concentrator 4. Indeed, if the transmitting member 3 is a concentrating photovoltaic cell, it is understood that it would be more advantageous to concentrate the solar energy on the entire surface of said cell rather than at one point.

For this, with reference to FIGS. 1 and 2, the positioning device 1 comprises a mounting 11 provided with at least one reserve 12 suitable for receiving and holding the optical concentrator 4 in a predetermined direction and allowing light to pass through said mounting 11, a receiver 13 suitable for receiving and holding the intake 2 of the transmitting member 3, and at least one spacer element 14 in order to keep said receiver 13 spaced apart from the mounting 11 in a stationary position relative to said reserve 12, said stationary position corresponding to the focal point of said optical concentrator 4.

The mounting 11 is a plate comprising a front face 15 situated on the side opposite the receiver 13, a rear face 16 situated on the side of the receiver 13, and a perimetric face 17 joining said front 15 and rear 16 faces.

The mounting 11 is advantageously made of a composite construction material for the purposes of durability over time and mechanical features.

Preferably, the material selected to produce the mounting 11 is ultra-high-performance fibre concrete (UHPFC). This concrete is obtained from a mixture of small aggregates and synthetic or metal fibres agglomerated by a binder such as for example cement and adjuvants. This concrete has very high mechanical features and excellent durability over time notably due to the very low porosity thereof. All the features of this concrete will make it possible to produce with precision very rigid large-scale mountings 11 suitable for receiving a plurality of optical concentrators 4 while ensuring precise and stable positioning of each associated transmitting member 3.

Furthermore, this type of concrete also has very good castability, enabling easy implementation of the manufacturing method described hereinafter.

The term ultra-high-performance fibre concrete denotes herein a fibre concrete having particularly a Young's modulus greater than 10 GPa (Gigapascal) and an equivalent flexural strength of 5 MPa (Megapascal).

The reserve 12 comprises an orifice 18 passing through the mounting 11 on either side and wherein the transverse section is homothetic to that of the peripheral face 8 of the optical concentrator 4. The reserve 12 further comprises a first countersink 19 formed on the front face 15 of the mounting 11 coaxially with said orifice 18. The transverse section of said first countersink 19 is homothetic to that of the peripheral face 8 of the optical concentrator 4. However, for obvious reasons in respect of support and expansion of the optical concentrator 4, the dimensions of the transverse section of the orifice 18 and the first countersink 19 are respectively slightly less or greater than those of the transverse section of the peripheral face 8 of the optical concentrator 4.

As such, the optical concentrator 4 is positioned in the first countersink 19 such that the convex dioptre 7 thereof is bearing on the edge of the orifice 15 situated on the side opposite the receiver 13. The optical concentrator 4 is secured to the mounting 11 by any suitable technique ensuring that the optical concentrator 4 is held in place while enabling the expansion thereof such as, for example, bonding, positioning of semi-rigid joints or fixing lugs.

The reserve 12 preferably comprises a second countersink 20 formed on the front face 15 of the mounting 11 coaxially with the first countersink 19. This second countersink 20 is suitable for receiving a transparent plate, not shown in the figures, to protect the optical concentrator 4 against adverse weather conditions and any shocks while allowing natural light to pass through.

The mounting 11 advantageously comprises fixing members, not shown in the figures, such as nuts or threaded rods at least partially inserted into said mounting 11 or orifices, these fixing members making it possible to secure the mounting 11 onto a structure.

The receiver 13 is preferably a tubular member comprising female or male connectors, not shown in the figures, suitable for engaging with male or female connectors, not shown in the figures, arranged on the intake 2 of the transmitting member 3.

The spacer 14 is advantageously a rigid rod fixed at the ends thereof respectively to the rear face 16 of the mounting 11 and the receiver 13 to keep the latter spaced apart from said mounting 11 in a stationary position relative to said reserve 12 and thus from the optical concentrator 4, said stationary position corresponding in the case of the hybrid lighting system 5 to the focal point of said optical concentrator 4.

According to one preferred embodiment, the spacer 14 comprises a thread on at least the end thereof in contact with the mounting 11.

Those skilled in the art will have no difficulty determining said stationary position on the basis of the type of optical concentrator 4 and that of the transmitting member 3.

The receiver 13 and spacer 14 are advantageously metallic and assembled using any suitable means such as welding, for example.

Advantageously, the positioning device 1 comprises four spacers 14 each angularly offset by 90° relative to the adjacent spacer 14.

Even more advantageously, the positioning device 1 comprises a mounting 11 with a plurality of reserve 12-receiver 13-spacer 14 assemblies suitable for associating a plurality of optical concentrators 4 with a plurality of transmitting members 3 so as to increase the quantity of natural light diffused inside a building and the number of diffusion zones.

Finally, the positioning device 1 according to the invention will be fixed by means of the fixing members thereof onto a structure, not shown, advantageously rigidly connected to the roof of a building. This structure will be preferably movable to follow the movement of the sun in the course of the day.

Figure 3:
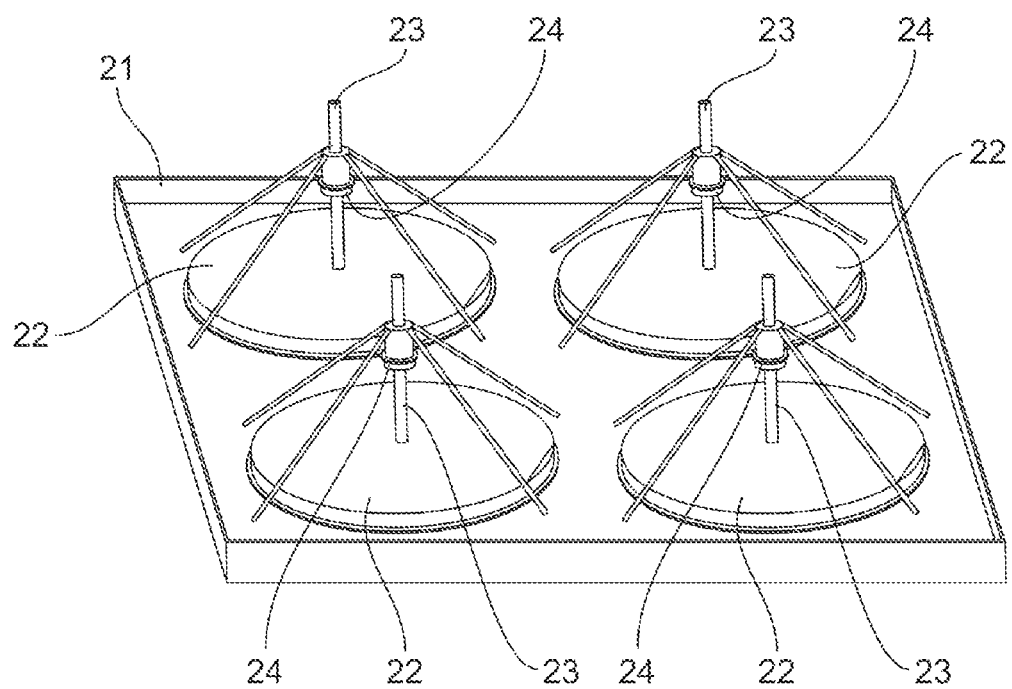
FIG. 3 is a perspective view of complete formwork used for manufacturing the positioning device in FIG. 1 according to a method according to the invention.

With reference to FIG. 3, the present invention also relates to the method for manufacturing said positioning device 1 comprising the following steps:

producing substantially horizontal formwork 21 determining the front face 15 and the perimetric face 17 of the mounting 11 of the positioning device 1;

positioning, in said formwork 21, one (or more) cavity/cavities 22 corresponding to the negative shape of the reserve(s) 12;

positioning at the centre of each cavity 22 a substantially vertical laying member 23, said laying member 23 being designed to position and hold the receiver 13 in the final position thereof during the manufacture of the positioning device;

fixing at least one spacer 14 on the receiver 13;

positioning a receiver 13 on the associated laying member 23;

casting ultra-high-performance fibre concrete material into the formwork 21 between the cavity/cavities 22 taking care to embed the free end of each spacer 14;

removing the formwork from the positioning device 1 in the upward direction.

It is clearly understood that the steps described above need not be executed in the order indicated. For example, the fixing of at least one spacer 14 on the receiver 13 may be carried out after positioning said receiver 13 on the associated laying member 23.

Similarly, it is clearly understood that, before the step for positioning the laying member 23, the assembly method may comprise a step for producing said laying member 23 with an abutment 24, said abutment 24 being arranged along the laying member 23 and such that, when the receiver 3 is bearing thereon, it is situated at the point of convergence of the beam of light rays from the optical concentrator 4.

The steps for producing the formwork 21 and positioning the cavity/cavities 22 are advantageously carried out simultaneously, if said formworks 21 and cavity/cavities 22 are obtained from a plate hollowed by machining.

It should further be noted that this manufacturing method comprises few steps and that it is particularly simple and quick to implement.

Figure 4:
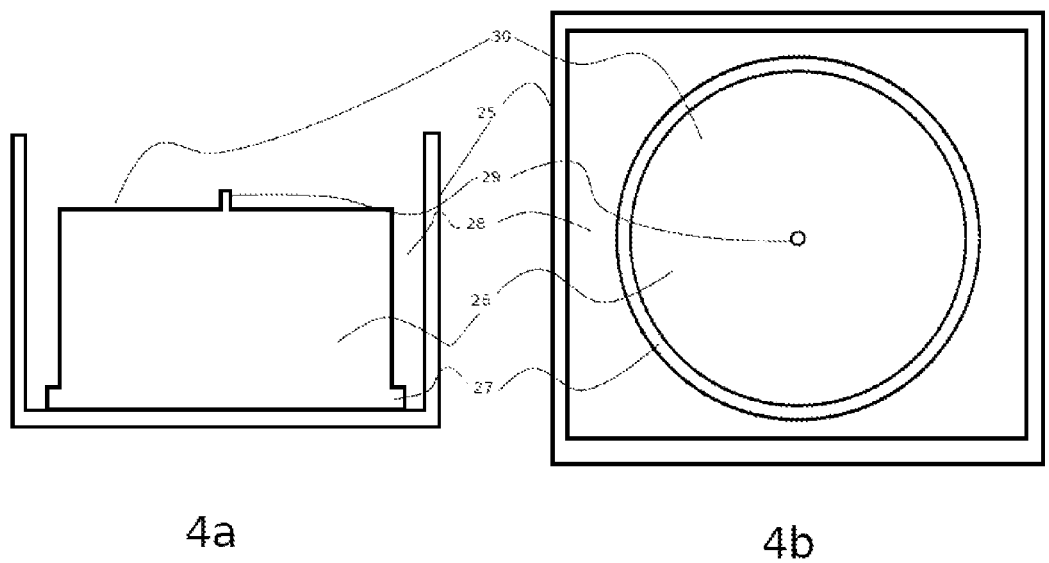
FIGS. 4a and 4b represent a cross-sectional view (4a) and a top view (4b) of complete formwork used according to a method according to the invention.
Figure 5:
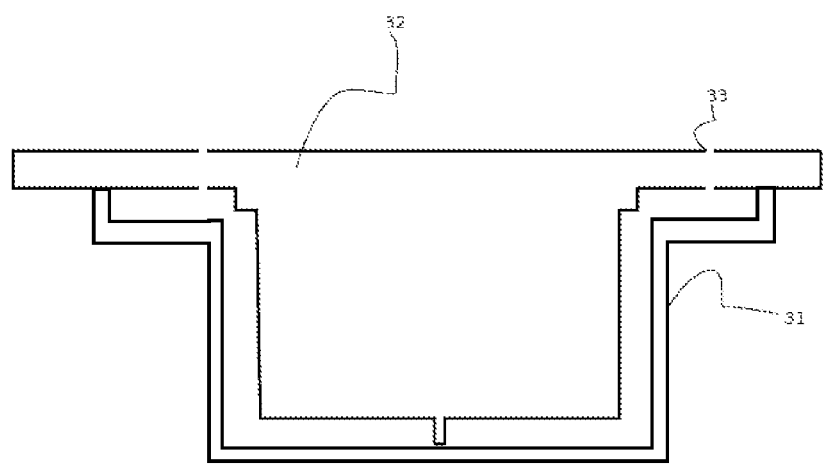
FIG. 5 is a sectional view of a mould and a countermould suitable for use in a method according to the invention.

FIGS. 4-5 represent other types of formworks, cavities, moulds and/or countermoulds suitable for use in a method according to the invention.

As such, FIG. 4 shows substantially parallelepipedic formwork 25 determining the front face and the perimetric face of the mounting of the positioning device, a cavity 26 corresponding to the negative shape of the reserve(s) 27, spacer 28 and intake 29. The formwork 25 is a parallelepiped open on the top face thereof and the cavity 26 forms a cylinder comprising on the top face 30 thereof a cavity 29 corresponding to the negative shape of said intake.

FIG. 5 shows a mould 31 forming a cavity having a T-shaped cross-section and a circular transverse section determining the front face, rear face and perimetric face of the mounting of the positioning device; and a countermould 32, corresponding to the negative shape of the reserve, spacer and intake. The concrete may be cast via the openings 33, or by casting beforehand in the mould 31 before introducing the countermould 32.

Finally, it is clearly understood that the use of ultra-high-performance fibre concrete as a construction material is very advantageous. Indeed, after the setting of said concrete, the spacers 14 are securely anchored in the mounting 1 without the use of further equipment and tools. The grip of the spacers 14 will be all the stronger if the latter are threaded at the end thereof which is embedded in the concrete.

The device 1 for positioning a light transmitting member 3 relative to an optical concentrator 4 according to the invention applies more particularly to hybrid lighting systems 5 such as light wells particularly for individual homes, but it may also be used for other systems such as electrical or thermal energy production systems.

Finally, it is obvious that the examples of the positioning device 1 according to the invention described above are merely particular illustrations, which are in no way restrictive, of the invention.

The invention claimed is:

1. A positioning device for high-precision positioning of the intake of a member for transmitting optical solar energy relative to a convergent optical concentrator, comprising:

a mounting, made of ultra-high-performance fiber concrete, provided with at least one reserve suitable for receiving and holding the optical concentrator in a predetermined direction and allowing light to pass through said mounting, a receiver suitable for receiving and holding the intake of a transmitting member, and at least one spacer element in order to keep said receiver spaced apart from the mounting in a stationary position relative to said reserve, said stationary position being defined in accordance with the features of the transmitting member and optical concentrator;

wherein the optical concentrator is a convergent lens comprising two frontal faces called the front dioptre and rear dioptre, and a peripheral face joining the two front and rear diopters; and wherein the reserve comprises an orifice passing through the mounting on either side and a first countersink formed on the front face of the mounting coaxially with said orifice, the respective transverse sections of the orifices and first countersink being homothetic to that of the peripheral face of the optical concentrator, the size of the transverse section of the orifice being slightly less than the size of the transverse section of the peripheral face of the optical concentrator, and the size of the first countersink being slightly greater than the size of the peripheral face of the optical concentrator.

2. The positioning device according to claim 1, wherein the mounting is a plate comprising a front face, a rear face, and a perimetric face joining said front and rear faces.

3. The positioning device according to claim 2, wherein each spacer is a rigid rod fixed at the ends thereof respectively to the rear face of the mounting and the receiver.

4. The positioning device according to claim 2, wherein each spacer is a hollow truncated cone-shaped part open on the greater diameter thereof and comprising on the base having a lesser diameter thereof a reserve suitable for receiving said receiver.

5. The positioning device according to claim 1, wherein the mounting comprises fixing members arranged to enable the securing of the mounting on a structure.

6. The positioning device according to claim 1, wherein the reserve comprises a second countersink formed on the front face of the mounting coaxially with the first countersink.

7. The positioning device according to claim 1, wherein the receiver is a tubular member comprising female or male connectors suitable for engaging with male or female connectors arranged on the intake of the transmitting member.

8. The method for manufacturing a high-precision positioning device, comprising:
producing substantially parallelepipedic formwork determining the front face and the perimetric face of the mounting of the positioning device;
positioning, in said formwork, at least one cavities corresponding to the negative shape of a reserve(s), spacer and intake;
casting ultra-high-performance fiber concrete material into the formwork between the cavity/cavities taking care to embed the cavity of the intake;
removing the formwork from the positioning device in the upward direction;
producing substantially parallelepipedic formwork determining the front face, a side face, and the rear face of the mounting of the positioning device;
positioning, in said formwork, at least one cavities corresponding to the negative shape of the reserve(s), spacer and intake;
casting ultra-high-performance fiber concrete material into the formwork between the cavity/cavities; and
removing the formwork from the positioning device.

9. The method for manufacturing a high-precision positioning device, comprising:
producing substantially parallelepipedic formwork determining the front face and the perimetric face of the mounting of the positioning device;
positioning, in said formwork, at least one cavities corresponding to the negative shape of a reserve(s), spacer and intake;
casting ultra-high-performance fiber concrete material into the formwork between the cavity/cavities taking care to embed the cavity of the intake;
removing the formwork from the positioning device in the upward direction;
producing a mould forming a cavity, having a T-shaped cross-section and a circular transverse section determining the front face, rear face and perimetric face of the mounting of the positioning device;
positioning in said mould a countermould, corresponding to the negative shape of the reserve(s), spacer and intake;
casting ultra-high-performance fiber concrete material into said mould;
removing the formwork from the positioning device in the upward direction by removing the countermould, and then from said mould in the upward direction.

* * * * *